United States Patent
Jerding et al.

(10) Patent No.: US 8,079,047 B1
(45) Date of Patent: Dec. 13, 2011

(54) PROGRAM INFORMATION SEARCHING SYSTEM FOR INTERACTIVE PROGRAM GUIDE

(76) Inventors: Dean F. Jerding, Roswell, GA (US); Arturo A. Rodriguez, Norcross, GA (US); Robert O. Banker, Cumming, GA (US)

(*) Notice: Subject to any disclaimer, the term of this patent is extended or adjusted under 35 U.S.C. 154(b) by 2606 days.

(21) Appl. No.: 09/590,904

(22) Filed: Jun. 9, 2000

Related U.S. Application Data

(60) Provisional application No. 60/138,757, filed on Jun. 11, 1999.

(51) Int. Cl.
   *H04N 5/445* (2011.01)
(52) U.S. Cl. ............... 725/53; 725/44; 725/51; 709/231
(58) Field of Classification Search ............. 725/37–61; 709/217–232
   See application file for complete search history.

(56) References Cited

U.S. PATENT DOCUMENTS

| | | | |
|---|---|---|---|
| 4,706,121 A | 11/1987 | Young | 358/142 |
| 4,751,578 A | 6/1988 | Reiter et al. | 358/183 |
| 4,908,713 A | 3/1990 | Levine | 358/335 |
| 4,963,994 A | 10/1990 | Levine | 358/335 |
| 5,038,211 A | 8/1991 | Hallenbeck | 358/142 |
| 5,253,066 A | 10/1993 | Vogel | 358/188 |
| 5,293,357 A | 3/1994 | Hallenbeck | 348/734 |
| 5,479,268 A | 12/1995 | Young et al. | 358/335 |
| 5,508,815 A | 4/1996 | Levine | 358/335 |
| 5,568,272 A | 10/1996 | Levine | 386/48 |
| 5,635,989 A * | 6/1997 | Rothmuller | 725/46 |
| 5,686,954 A * | 11/1997 | Yoshinobu et al. | 725/43 |
| 5,809,204 A | 9/1998 | Young et al. | 386/83 |
| 5,880,768 A | 3/1999 | Lemmons et al. | |
| 5,915,068 A | 6/1999 | Levine | 386/83 |
| 6,005,565 A * | 12/1999 | Legall et al. | 715/721 |
| 6,014,184 A * | 1/2000 | Knee et al. | 725/45 |
| 6,141,003 A * | 10/2000 | Chor et al. | 715/719 |
| 6,177,931 B1 * | 1/2001 | Alexander et al. | 725/52 |
| 6,184,877 B1 * | 2/2001 | Dodson et al. | 725/110 |
| 6,209,130 B1 * | 3/2001 | Rector et al. | 725/50 |
| 6,216,264 B1 * | 4/2001 | Maze et al. | 725/53 |
| 6,243,142 B1 | 6/2001 | Mugura et al. | 348/564 |
| 6,266,814 B1 * | 7/2001 | Lemmons et al. | 725/44 |
| 6,268,849 B1 * | 7/2001 | Boyer et al. | 725/40 |
| 6,486,920 B2 * | 11/2002 | Arai et al. | 348/563 |
| 6,536,041 B1 * | 3/2003 | Knudson et al. | 725/39 |
| 6,564,383 B1 * | 5/2003 | Combs et al. | 725/136 |
| 6,708,336 B1 * | 3/2004 | Bruette | 725/57 |
| 6,732,367 B1 * | 5/2004 | Ellis et al. | 725/27 |
| 2003/0079227 A1 * | 4/2003 | Knowles et al. | 725/50 |
| 2004/0221310 A1 * | 11/2004 | Herrington et al. | 725/46 |
| 2005/0155056 A1 * | 7/2005 | Knee et al. | 725/35 |
| 2005/0216936 A1 * | 9/2005 | Knudson et al. | 725/42 |
| 2005/0251822 A1 * | 11/2005 | Knowles et al. | 725/39 |
| 2005/0278741 A1 * | 12/2005 | Robarts et al. | 725/46 |

FOREIGN PATENT DOCUMENTS

| | | |
|---|---|---|
| WO | WO 96/41478 | 12/1996 |
| WO | WO 98/03012 | 1/1998 |

* cited by examiner

*Primary Examiner* — Annan Shang
(74) *Attorney, Agent, or Firm* — Merchant & Gould

(57) ABSTRACT

An apparatus and method for searching for television program information using a programmable television services client device that includes memory for storing data, display configuration information contained in the memory, and a processor. The display configuration information includes a guide arrangement configured in a search format for displaying a prompt for user input designating a television program search parameter. The processor is responsive to user input and is configured to cause a search result related to the television program search parameter to be displayed on a viewing device.

56 Claims, 10 Drawing Sheets

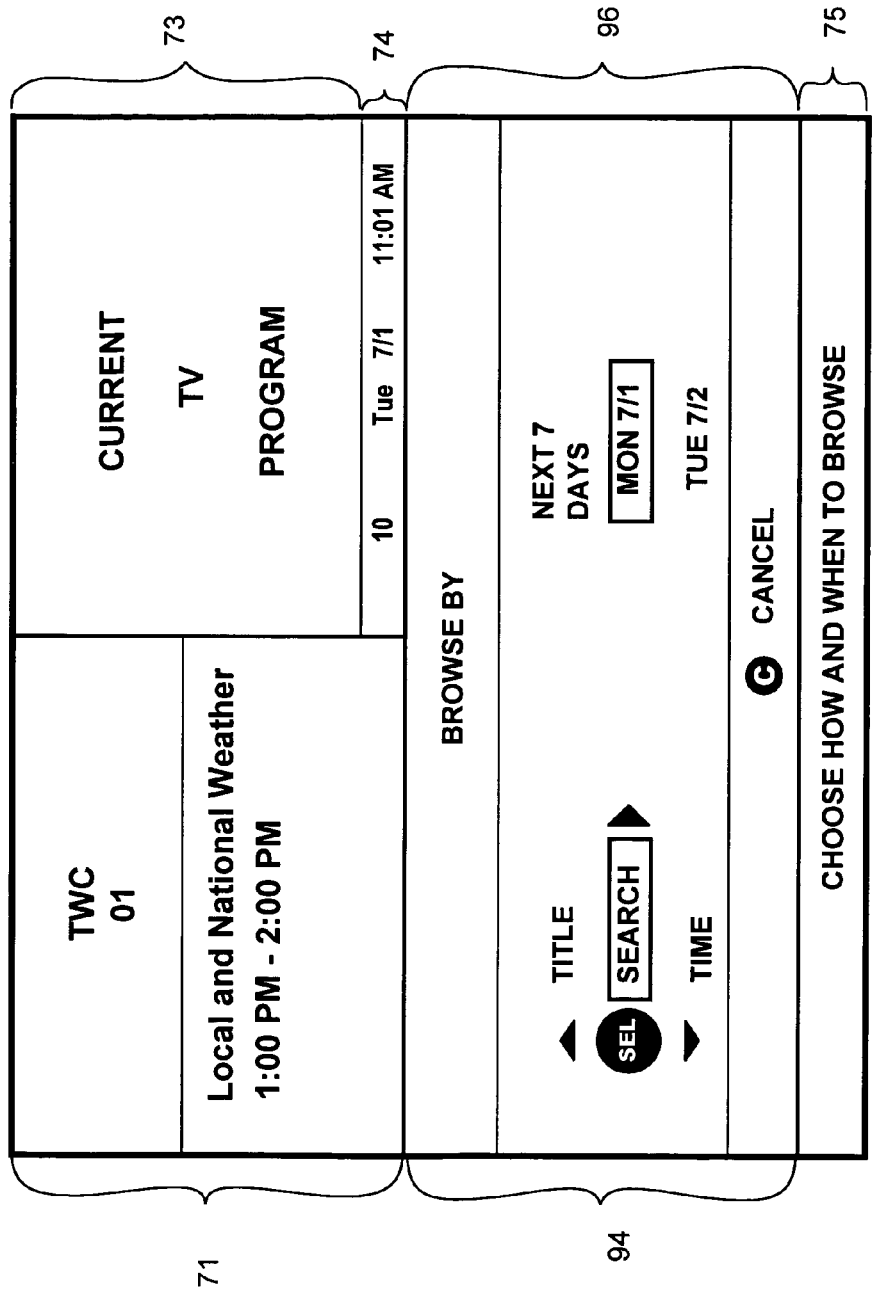

PROGRAM INFORMATION SEARCHING SYSTEM FOR INTERACTIVE PROGRAM GUIDE

CROSS-REFERENCE TO RELATED APPLICATIONS

This application claims the benefit of U.S. Provisional Application No. 60/138,757, filed Jun. 11, 1999, which is also hereby incorporated by reference herein in its entirety.

FIELD OF THE INVENTION

This invention relates in general to television systems, and more particularly, to the field of interactive program guides.

BACKGROUND OF THE INVENTION

Historically, television services have been comprised of analog broadcast audio and video signals. Cable television systems now receive broadcasts and retransmit them with other programming to subscribers over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the settop box, has become an important computing device for accessing video services and navigating a subscriber through a maze of services available. In addition to supporting traditional analog broadcast video and functionality, digital HCTs (or "DHCTs") now also support an increasing number of services which are not analog, but rather digital; are not basic broadcast, but rather two-way communication such as video-on-demand; and are not basic video, such as e-mail or web browsers. These are all in addition to the host of other television services which are increasingly being demanded by consumers, examples of which include audio and audio/visual programming, advance navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those which have traditionally been provided.

Each HCT and DHCT (collectively hereinafter "DHCT") are typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, a communication component and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As more and more services and applications are provided, cable television systems are providing television program information to the DHCT so that the subscriber can view the program information on the DHCT display such as the television. This program information has traditionally been organized for presentation purposes into a program guide format that presents the program information by time and channel only. The program guide can, for instance, automatically scroll the available television channels to present the program information such as name and title, by time.

Many cable system operators include one or more dedicated channels that scroll through the channel list displaying the programs that not only are currently on, but also are scheduled to be on in the future. These types of passive displays do not rely on a terminal for presentation of the programming data and also lack the interactive functionality of permitting a subscriber to scroll to a desired channel for a desired time. For example, the subscriber typically must view the programming information as it scrolls on the display and wait for either the desired channel and/or the desired time to search for the program that may be available for viewing.

With the advent of program guide "browsers" for use in cable television systems, viewers (also referred to as "subscribers" or "users") can literally scan program information by time and channel while watching the tuned channel. In analog systems that offer a limited number of cable television channels, these browsers enable the viewer to easily scan available programs one-by-one in order of channel number. However, many digital systems can provide hundreds or even thousands of channels. In such systems, scanning program information by channel numbers sequentially can require many keystrokes by the viewer and can consume tremendous amounts of time. Additionally, locating a particular television program can be quite tedious if the viewer does not already know the name or number of the channel on which the television program will be showing. Traditional program guides have also typically been little more than grids with the channel time and number presented on x and y axes respectively. As a result, there is a need for interactive program guides that flexibly provide applications to enable viewers to easily and efficiently locate television program information that they are seeking.

SUMMARY OF THE INVENTION

Briefly described, the preferred embodiment of the present invention provides an apparatus and method for searching for television program information. A programmable television services client device is provided for enabling a user to search through television program information. The client device preferably includes memory for storing data, display configuration information contained in the memory, and a processor. The display configuration information includes a guide arrangement configured in a search format for displaying a prompt for user input designating a television program search parameter. The processor is responsive to user input and is configured to cause a search result related to the television program search parameter to be displayed on a viewing device.

One advantage of the preferred embodiment of the invention is that it flexibly and efficiently solves the problem of information overload that a user might experience in attempting to navigate between hundreds, or thousands, of potential channels in order to find out at what time and on what channel a certain television program is or will be playing.

Other objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts or screen areas throughout the several views.

FIG. 10 is an example screen diagram that illustrates a guide arrangement with a browse-by menu and selectable date periods.

DETAILED DESCRIPTION OF THE PREFERRED EMBODIMENTS

Figure 1:
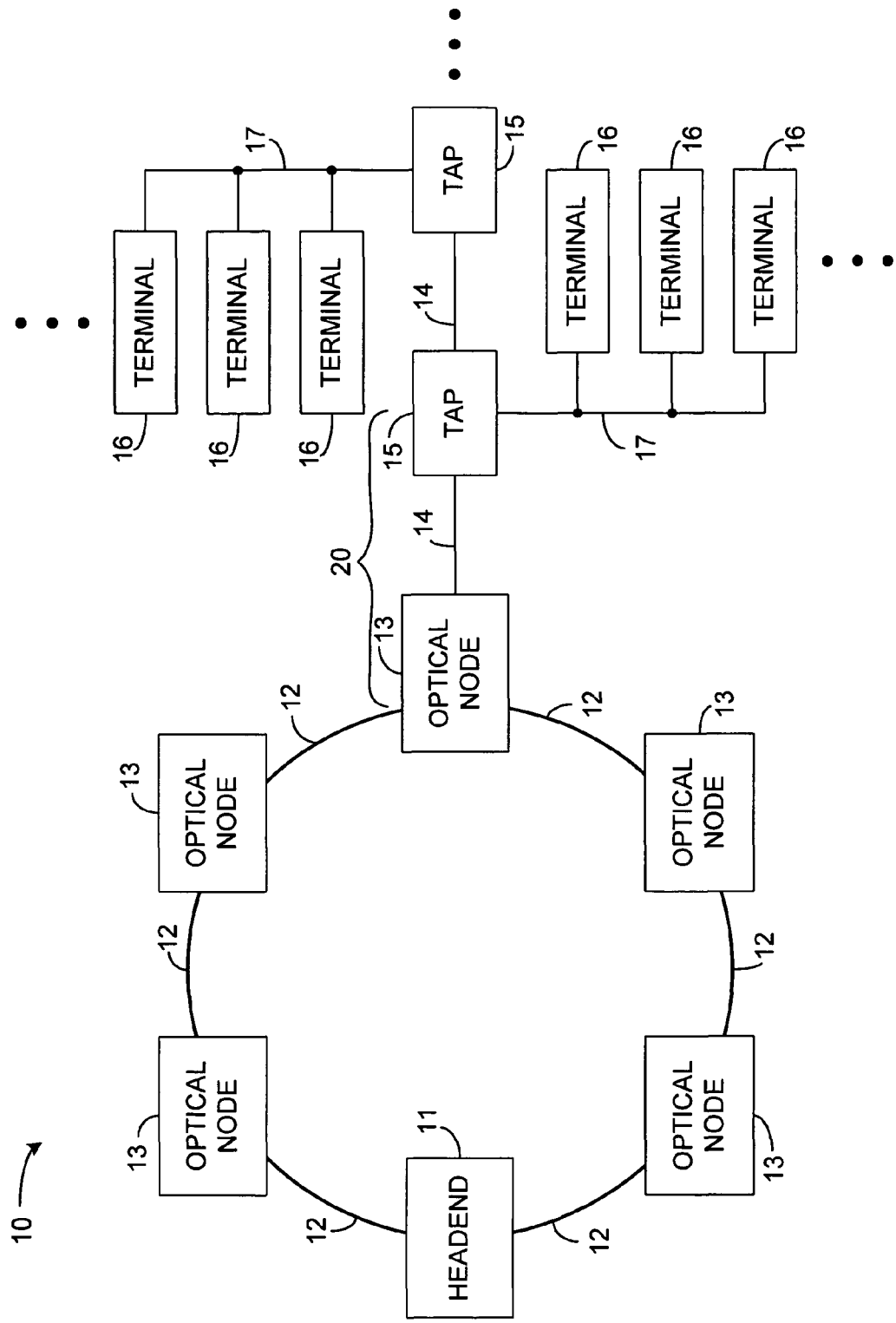
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial in 5 cables 14. Taps 15 are provided within the cable system 10 for splitting the RF signal off, via cables 17, to subscriber equipment such as DHCTs 16, cable-ready television sets, video recorders, or computers: Thus, headend 11 is connected through a network 20 to multiple DHCTs 16.

Figure 2:
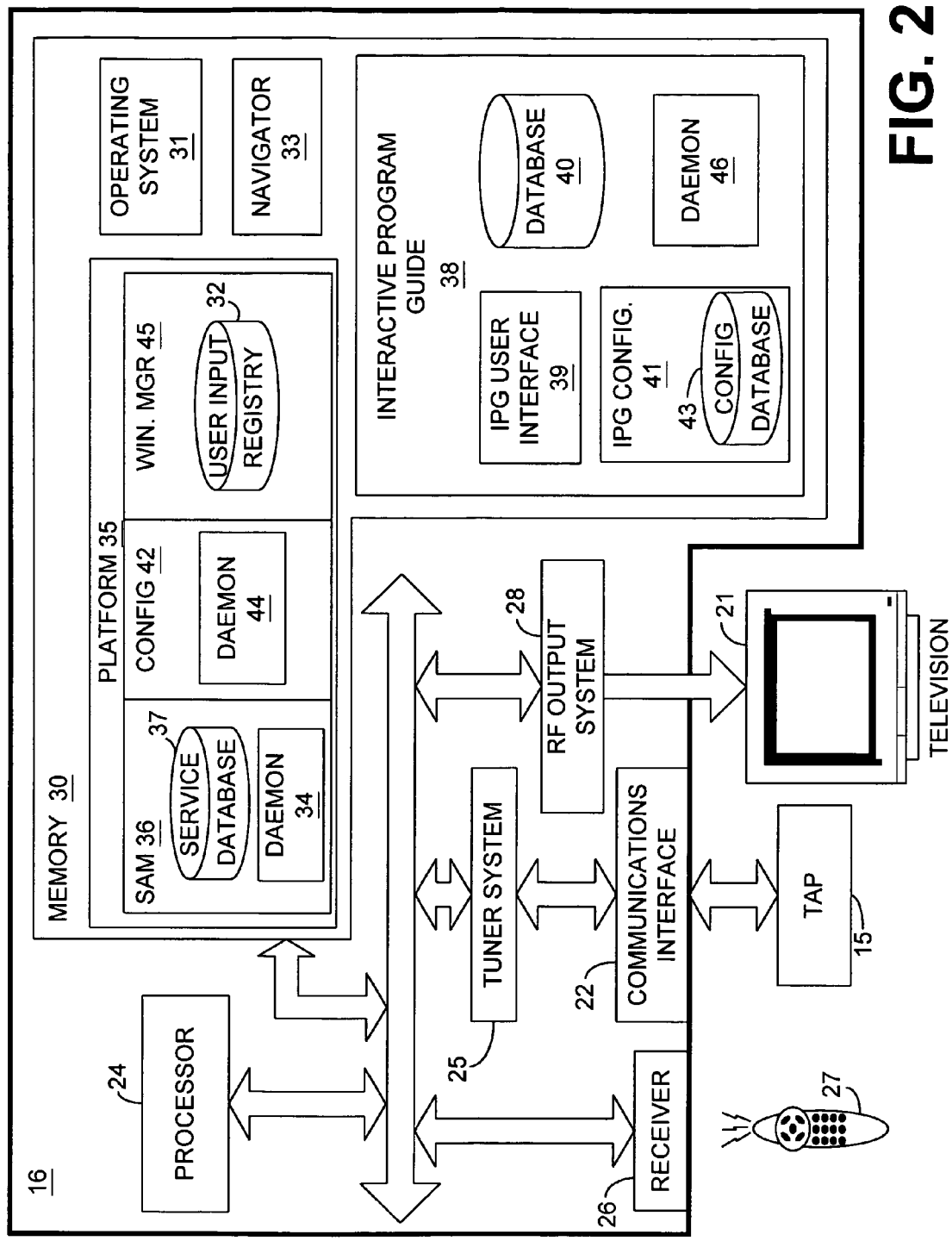
FIG. 2 is a block diagram of a DHCT and related equipment, in accordance with one preferred embodiment of the present invention depicted in FIG. 1.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included in a computer or a television, and that processes television signals for presentation to a subscriber. The terminal 16 preferably comprises a communications interface 22 for receiving the RF signals, which can include video, audio and data information, from the tap 15 and for providing any reverse information to the tap 15 for transmission back to the headend 11 (FIG. 1). The DHCT 16 further includes a processor 24 for controlling operations of the DHCT 16, a video output port such as an RF output system 28 for driving the display 21, and a tuner system 25 for tuning into a particular television channel to be displayed and for sending and receiving various types of data from the headend 11. The tuner system includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as subscriber inputs or commands from other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), and serial, and/or parallel ports. The subscriber inputs may, for example, be provided by a computer or transmitter with buttons or keys located on the exterior of the terminal, by a hand-held remote control device 27, or by a keyboard that includes subscriber-actuated buttons.

Memory 30, such as a non-volatile and dynamic random access memory, is coupled to the processor 24 and stores operational parameters, such as commands that are recognized by the processor 24. The most basic functionality of the DHCT 16 is provided by an operating system 31 that operates in memory 30. One or more programmed software applications, herein referred to as applications, are executed by utilizing the computing resources in the DHCT 16. The executable application program stored in memory 30 is executed by processor 24 (e.g., a central processing unit or digital signal processor) under the auspices of the operating system 31. Data required as input by the application program is stored in memory 30 and read by processor 24 from memory 30 as need be during the course of application program execution. Input data may be data stored in memory 30 by a secondary application or other source, either internal or external to the DHCT 16, or may have been created with the application program at the time it was generated as a software application program. Data may be received via any of the communication ports of the DHCT 16, from the headend 11 via the DHCT's network interface (i.e., the QAM or out-of-band tuners) or as subscriber input via receiver 26. A type of input data fulfills and serves the purpose of parameters as described below. Data generated by application program is stored in memory 30 by processor 24 during the course of application program execution. Availability, location and amount of data generated by a first application for consumption by a secondary application is communicated by messages as described below. Messages are communicated through the services of the operating system 31, such as interrupt or polling mechanisms or through data sharing mechanisms such as semaphores.

A Navigator (application) 33 is responsible for providing the subscriber the capability to select services and also provides a core functionality of the DHCT 16, including volume and settings. To implement its functionality, the Navigator 33 communicates with a platform 35, which is a collection of functionality such as the services application manager (SAM) 36, a Configuration Manager 42, and a Window Manager 45 that is useful to the applications. The platform 35 may also include such functionality as a Timer Manager, a Compression Manager, an HTML Parser, a Database Manager, A Widget Toolkit, and other utilities (not shown).

In one implementation, the Window Manager 45 maintains, among other things, a user input registry 32 so that when a subscriber enters a key or a command via the remote device 27 or another input device such as a keyboard or mouse, the user input registry 32 is accessed to determine which of various applications running on the DHCT 16 should receive the inputted key and it what order. The Navigator 33 registers for certain user input commands with the Window Manager 45 so that when the subscriber hits a key corresponding to one of the commands on the remote 27, the command is received by the receiver 26 and relayed to the processor 24. The processor 24 dispatches the event to the operating system 31 where it is forwarded to the Window Manager 45, which ultimately accesses the user input registry 32 and routes the incoming command to the Navigator 33. The Navigator 33 registers for user input commands that correspond to service navigation functions such as selecting a channel (channel increment, channel decrement, favorite, last) and those for other reserved functionality such as a key to activate the program guide.

After the Navigator 33 is activated by the remote 27, it sends a command to a services application manager ("SAM") component 36 part of the platform 35. The SAM 36 maintains a services database 37 of all services available on the DHCT 16 that the subscriber may access. A service is a pairing of an application and a parameter, such as a WatchTV application (not shown) and the television program to tune (e.g. NBC), or an Email application (not shown) and the IP address of the Email server. When the SAM 36 receives a query from the Navigator 33, it accesses the service database 37 and informs the Navigator 33 about the existence and status of the requested service. The Navigator 33 can further query the SAM 36 to determine if the service is authorized for the DHCT 16 and, if so, subsequently command the SAM to activate the service. In response, the SAM 36 initiates an activate service message to the application identified in the service database as the provider of the desired service. As a non-limiting example, the subscriber pressing a "GUIDE" key on the remote 27 would activate the interactive program guide (application) 38. That is, the subscriber presses a first key that invokes display of an interactive program guide (IPG) 38 presentation session.

The IPG 38 displays a program guide to the subscriber and populates the guide with program data for selection. Contained in the IPG 38 is a user interface component 39 that controls the screen display presented to the subscriber on display 21. When the user interface 39 receives the activation message from the SAM 36, the user interface 39 proceeds in accessing an IPG database 40 and a configuration module 41 to determine the appropriate program guide configuration (initial guide arrangement or view) to present to the subscriber on the display 21. The IPG database 40 contains program data files of current and future television programs. An IPG configuration module 41 stores settings that the user interface 39 will implement in creating the display for the subscriber. According to the preferred embodiment of the present invention, the IPG configuration module 41 includes a configuration database 43 of all configurations relevant to the IPG 38. The configuration library 42 allows applications to access configurations stored in other applications, such as the IPG configuration database 43. Some of these configurations are pre-loaded into DHCT 16 non-volatile memory before it is released to a subscriber for use in viewing television services. Additionally, configurations can be updated, added, or replaced in the DHCT 16 by communicating the configuration data files 54 (FIG. 3) from the headend 11 to Configuration Daemon 44 which writes the configuration data files 54 to the various application configuration databases, such as the IPG configuration database 43. Although the IPG configuration database 43 provides a variety of initial configurations that the IPG user interface 39 may implement, one of these is denoted as the selected configuration that is ultimately implemented by the user interface 39. The configuration daemon 44 on the platform 35 will update the application configuration databases, such as IPG configuration database 43, whenever the DHCT 16 is powered up or when the configuration daemon 44 receives an update message from the headend 11 with new settings for the configurations.

When the IPG user interface 39 receives the activate service command from the SAM 36 responsive to a user selecting the IPG from the remote 27, the IPG user interface 39 accesses the IPG configuration module 41 to determine which viewing arrangement to present to the subscriber on the display 21. Based on the configuration information stored in the configuration module 41, the user interface 39 utilizes the window manager 45 and other graphics utilities provided by the operating system 31 to draw the screen on the display 21. The window manager 45 is a component that in one embodiment is part of the platform 35, but in other embodiments may be part of the operating system 31. In addition to the user input registry mentioned previously, it contains functionality for managing screen real-estate and synchronizing the drawing done by multiple applications. The operating system 31 provides primitives to the user interface 39 to, for example, to create a rectangular region on display 21 and to draw into that rectangle graphics utilities such as lines, shadings and strings.

As a window is created on display 21 for presentation to the subscriber, the IPG user-interface 39 registers with the window manager 45 for particular user input commands that are required by the newly-created window on the display 21. The IPG 38 also contains a daemon 46 that receives program data files 53 from the headend 11, and the daemon 46 stores the program data files 53 in the database 40 for utilization by the user interface 39.

The Navigator application 33, IPG 38, and all other applications executed by the resources of the DHCT 16 comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, solid-state, magnetic, optical, electromagnetic, infrared, or semiconductor system, apparatus, device, or propagation medium, either internal to the DHCT 16 or externally connected to the DHCT 16 via one or more communication ports or network interfaces. More specific examples (a nonexhaustive list) of the computer-readable medium would include the following: an electrical connection (electronic) having one or more wires, a portable computer diskette (magnetic), a hard drive storage device (magnetic) a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code or programmed software which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 3:
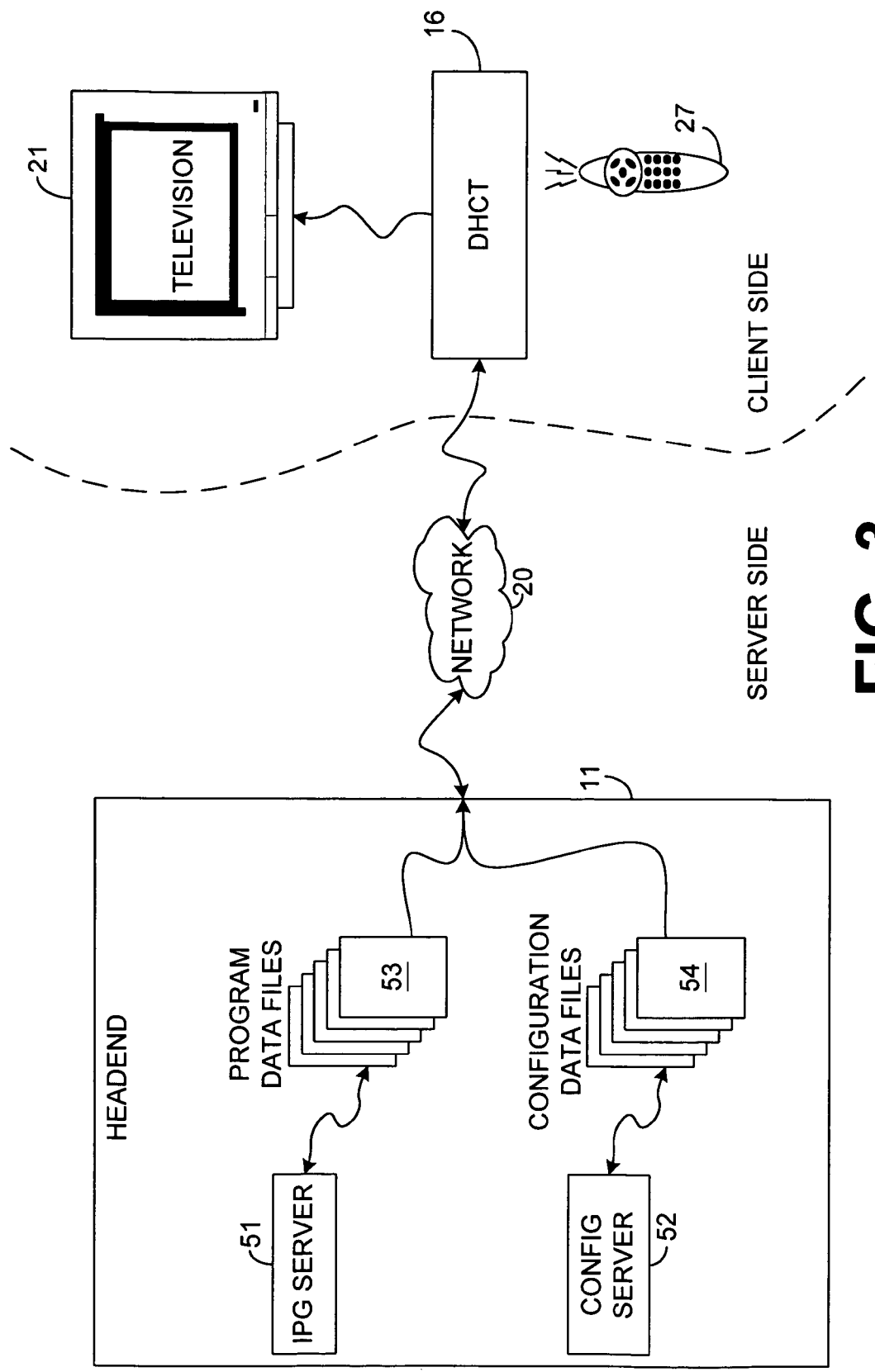
FIG. 3 is a diagram depicting files that are transferred from the headend of the cable television system across to the DHCT depicted in FIG. 2.

FIG. 3 is a diagram of selected components resident on the headend 11 and their interaction with the DHCT 16 on the client side of the network 20. An IPG server 51 is contained on the headend 11 and assembles program data files 53 for transmission across the network 20 to the IPG daemon 46 (FIG. 2) in the DHCT 16. The program data files 53 are the data files that contain information about current and of future programs, including their prospective viewing times, descriptive information, channels etc. The IPG server 51 allows the system operator to configure how many days in advance for which the program data files 53 will contain programming information. A configuration server 52 maintains and transmits across network 20 configuration data files 54 that comprise a plurality of program guide arrangement definitions, as well as indication of a selected initial program guide arrangement for the display 21.

With reference to FIG. 2, the configuration daemon 44 receives the configuration information and stores it in the IPG configuration database 43 from which configuration module 41 accesses the information, as discusses above. The program data files 53 (FIG. 3) created by the IPG server 51 on the headend 11 are received by the IPG Daemon 46 which populates the IPG database 40 in memory 30 with the program data files 53 for utilization by the user interface 39 when commanded by the subscriber. Alternatively, the IPG database 40, or parts thereof may be stored in a storage device that is internal to the DHCT 16 or externally connected to the DHCT 16 via a communication port such as USB or IEEE-1394.

In FIG. 2 and FIG. 3, functionality of the various layers of software, including the operating system 31, platform 35, and applications such as the IPG 38 and Navigator 33 are generally present on both the client side and the server side of the cable television system. The Navigator 33 assists in providing basic cable services and navigation framework to the subscriber. The services available can include watching television and pay-per-view events, listening to digital music, and viewing the interactive program guide 38 (FIG. 2). The Navigator 33 also allows subscribers to access the settings in the DHCT 16 (FIG. 2), including volume, parental control, VCR commands, etc. The operating system 31 is a resident operating system on the DHCT 16 and is provisioned for reception of multi-media data over the broadcast and interactive cable networks and uses an open and modular platform to allow flexibility and customization. As a result, some features of the operating system 31 include real time multi-media data reception, streaming and processing, as well as multi-tasking capability, and an open platform. The operating system 31 also provisions the communication of data among different entities such as a multiplicity of applications executing in the DHCT 16. The application interface system (AIS) or Platform 35 is a collection of end-to-end software interfaces enabling applications on the cable televisions system network 10. The SAM 36 provides an interface and mechanism through which applications can be developed, introduced on the network, defined as a service, downloaded to the DHCT 16, executed on the DHCT 16 and removed from the network. The MS is an end layer of application and service management software components that an application must utilize to exist in the cable television system network 10. It also consists of resource access and management components generally required by applications in the cable television system network 10. None of the MS components have any client-side subscriber-interface, although graphical subscriber interfaces can exist to access server-side components.

Figure 4:
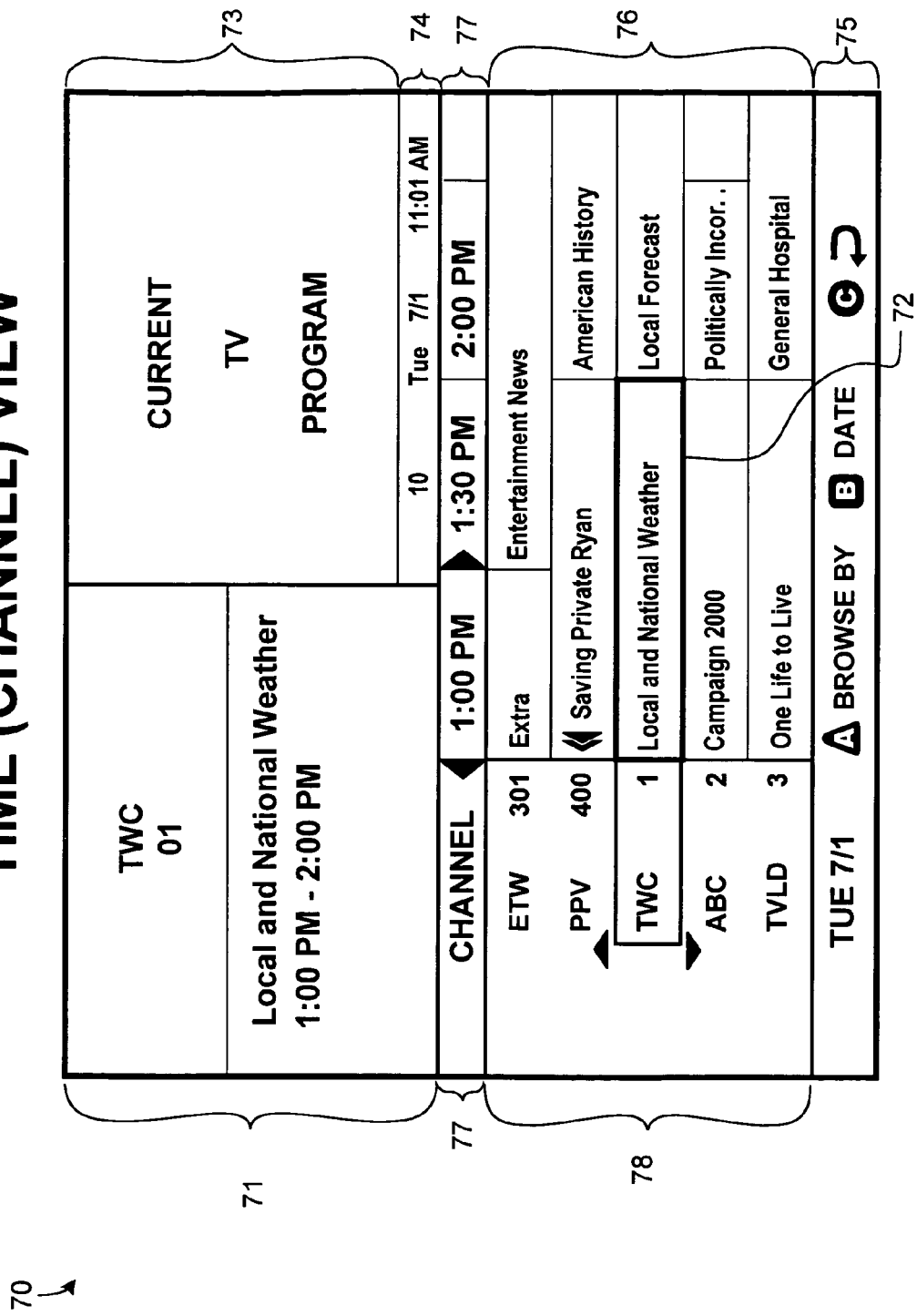
FIG. 4 is an example screen diagram that illustrates an initial guide arrangement in a time format that the DHCT as depicted in FIG. 2 presents the subscriber.

FIG. 4 is an example screen diagram that illustrates an initial guide arrangement in a time format that the IPG UI 39 as depicted in FIG. 2 presents the subscriber. The top left portion of the main IPG display 70 is a detailed focus area 71 that includes detailed channel information (channel number, channel name (TWC), program name, program description, duration, any episode information or rating, etc.) for an "in-focus" program corresponding to highlighted program area 72 in a main program display area 76. Video showing on the channel to which the DHCT 16 is currently tuned (for which audio is also playing, and which is typically the program occupying the full screen before the IPG UI 39 is activated) is displayed in a roughly one-quarter screen current program video area 73 in the IPG display 70. Immediately below the current program video area 73 is an information banner 74 depicting the channel to which the DHCT 16 is currently tuned, the current day and date, and the current time. The middle left portion of the IPG display 70 includes a channel area 78 that is related to the selected ordering format and is described in more detail below. The middle portion of the IPG display 70 includes a heading portion 77 that contains headings related to the information displayed in the channel area 78 and the main program display area 76. The main program display area 76 contains television program titles corresponding to television programs that are or will be available for viewing during the time periods listed under the heading portion 77. The highlighted program area 72 is centered in the main program display area 76 enabling the subscriber to scroll up and down to the various program titles listed in the main program display area 76.

The main program display area 76 includes program names organized in a grid of rows of channels and columns of time. The channel area 78 includes a vertical list of channels organized sequentially from top to bottom by increasing channel number. The main program display area 76 can be scrolled in both time and channel number dimensions. The time dimensions are a horizontal array of program names categorized in columns of times in which they are broadcast. As the subscriber scrolls in time across a calendar day boundary, the selected day displayed in various areas is automatically updated.

When the IPG 38 is first activated by the subscriber and the time view is configured to be the initial view, the first, or lowest, channel, including channel name and number, in the channel lineup is centered in the channel portion of the IPG display 78. In this non-limiting example, the lowest channel in this channel list displayed in the channel area 78 is The Weather Channel (TWC), which is shown as channel 1. Continuing with this non-limiting example, the left-most time column in the main program display area 76 is set to include titles of programs scheduled to be broadcast about two hours into the future with the middle title being "in-focus" and corresponding to a program on the lowest channel. Therefore, in this example, the program Local and National Weather which is on channel 1, is centered in the highlighted program area 72. It should be noted that the current program shown in current program video area 73 and referenced in information banner 74, corresponds to channel 10 and not to the in-focus program on channel 1. The bottom area 75 of IPG display 70 indicates the selected day for which program data is being displayed as well as the options for the "A", "B", and "C" keys on the remote 27 (FIG. 2). The "A" key is shown assigned to invoke a "Browse-by" menu which would function as discussed below. The "B" key enables the subscriber to select a different date for viewing or searching program data via the IPG display 70. Operation of the "C" key results in the displaying of television program titles in the main program display area 76 which correspond to television programs that are or will be playing during a time period that includes the current time, with the program title currently on the channel to which the DHCT is tuned 73 highlighted and "in focus" 72. The time period of the display in portion 75 and the times listed the heading portion 77 are updated accordingly.

Figure 5:
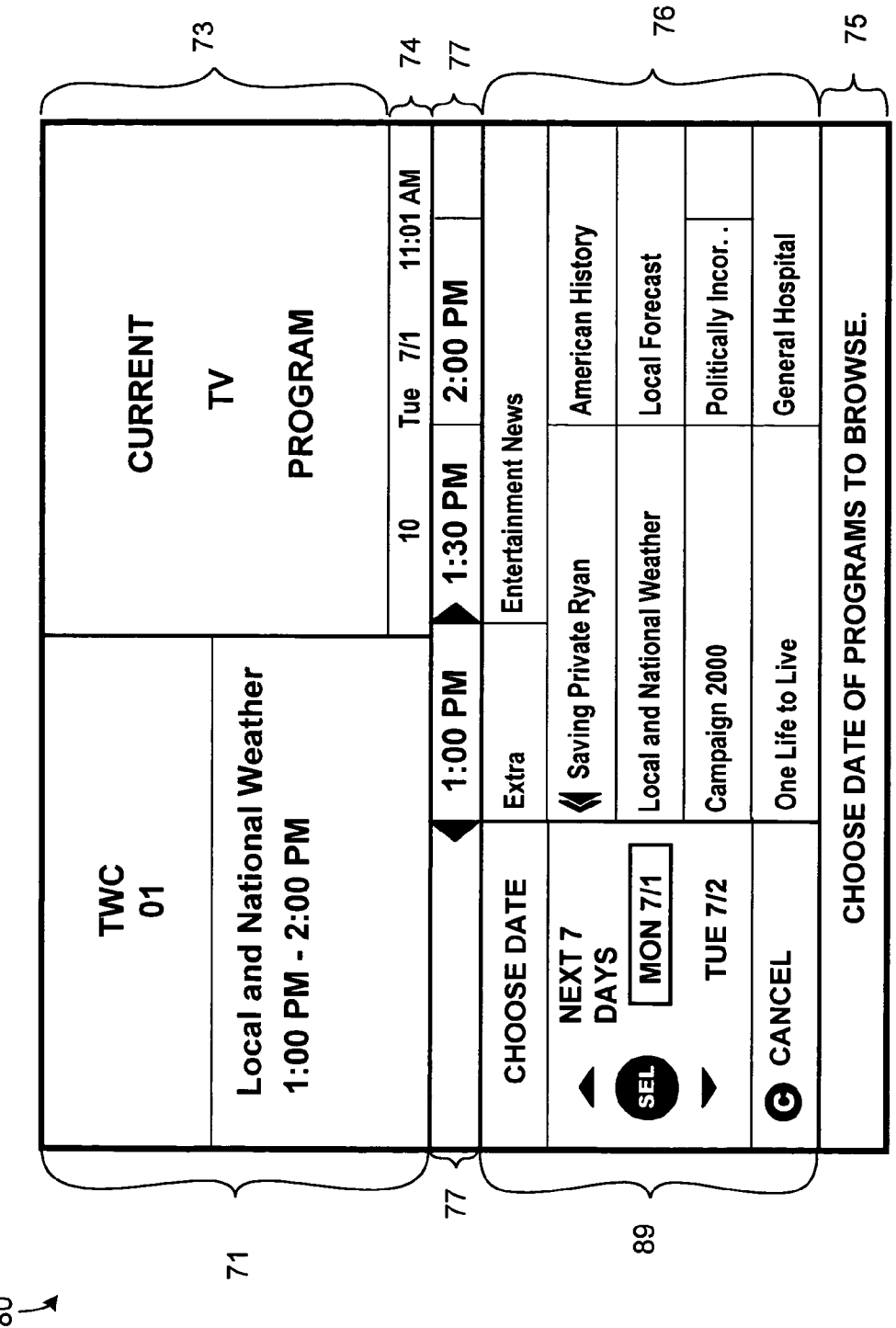
FIG. 5 is an example screen diagram that illustrates a guide arrangement containing selectable time periods that the DHCT as depicted in FIG. 2 presents to the subscriber.

FIG. 5 is an example screen diagram that illustrates a guide arrangement that is displayed following the activation of the "B" key on the remote 27 (FIG. 2) while the initial guide arrangement 70 illustrated in FIG. 4 is being presented to a subscriber. A list of time periods is displayed in an input portion 89 of the IPG display 80 with the default in-focus time period corresponding to the current day. The IPG display 80 enables a subscriber to select a time period that corresponds to the television program information that the subscriber is interested in viewing or searching. In this non-limiting example, if a subscriber wants to view or search television program information for a day other than the current day, the remote 27 (FIG. 2) may be used to direct the IPG UI 39 (FIG. 2) to scroll the display to and to then select an alternative time period that is listed in the input portion 89. In accordance with the preferred embodiment of the present invention, single dates and ranges of dates are available, including actual dates, e.g., "Mon 7/1", as well as relative dates, "Next 7 Days", "Today and Tomorrow" (not shown), etc. Of course, other selections are available in other embodiments of the present invention. After a time period in input area 89 is selected, the television program information that is subsequently presented or searched by the IPG UI 39 will correspond to the selected time period. The IPG display 70 (FIG. 4) is presented to the subscriber in place of the IPG display 80 either after a time period selection is made or after the subscriber presses the "C" button on the remote 27 (FIG. 2). Note that the selected time period is ordinarily displayed at the bottom of the IPG display 70 in section 75. Video for the channel that is currently tuned by the DHCT 16 is displayed in the current program video area 73 with the current channel number, day, date and time displayed in the information banner 74.

Figure 6:
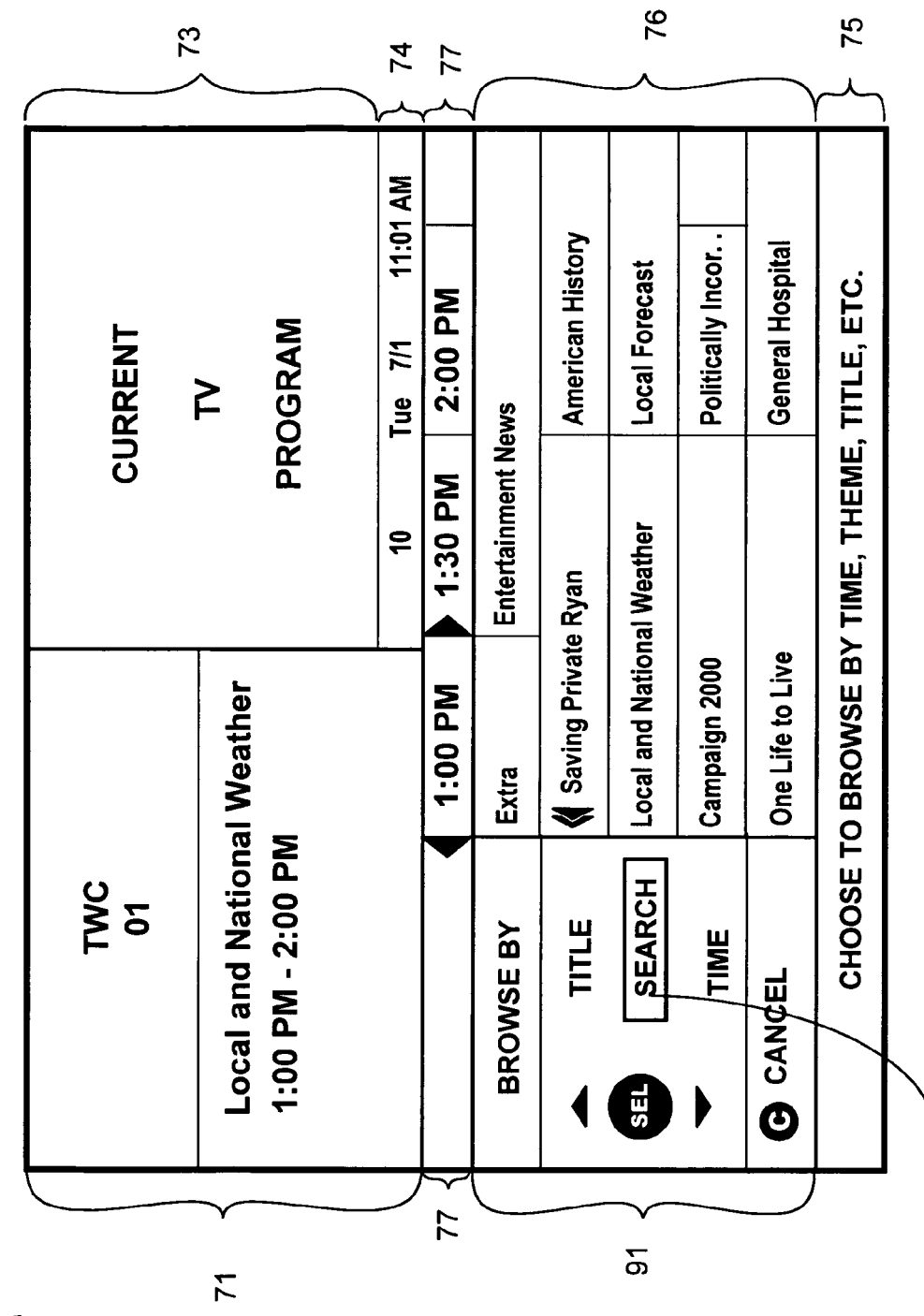
FIG. 6 is an example screen diagram that illustrates a guide arrangement with a browse-by menu.

FIG. 6 is an example screen diagram of an IPG display 90 that illustrates a guide arrangement in a browse-by format that the IPG 38 in FIG. 2 presents to a subscriber after the subscriber presses the "A" button on the remote 27 (FIG. 2). Video for the channel that is currently tuned by the DHCT 16 is displayed in the current program video area 73 with the current channel number, day, date and time displayed in the information banner 74. By using the remote 27, the subscriber can also interact with the IPG UI 39 while the IPG display 90 is being presented in order to select an alternative viewing format, as listed in the browse by area 91, in which a guide arrangement presents television program information.

In addition to presenting television program information in a format based on time and channel number, the IPG 38 may be configured to present a guide arrangement in a format that limits the television program information presented to information that corresponds to television program titles containing a specific word or character sequence as specified through user input. By selecting the in-focus selection "SEARCH" 92 in the browse-by area 91 a subscriber is presented with a guide arrangement in a search format 100 as depicted in FIG. 7.

Figure 7:
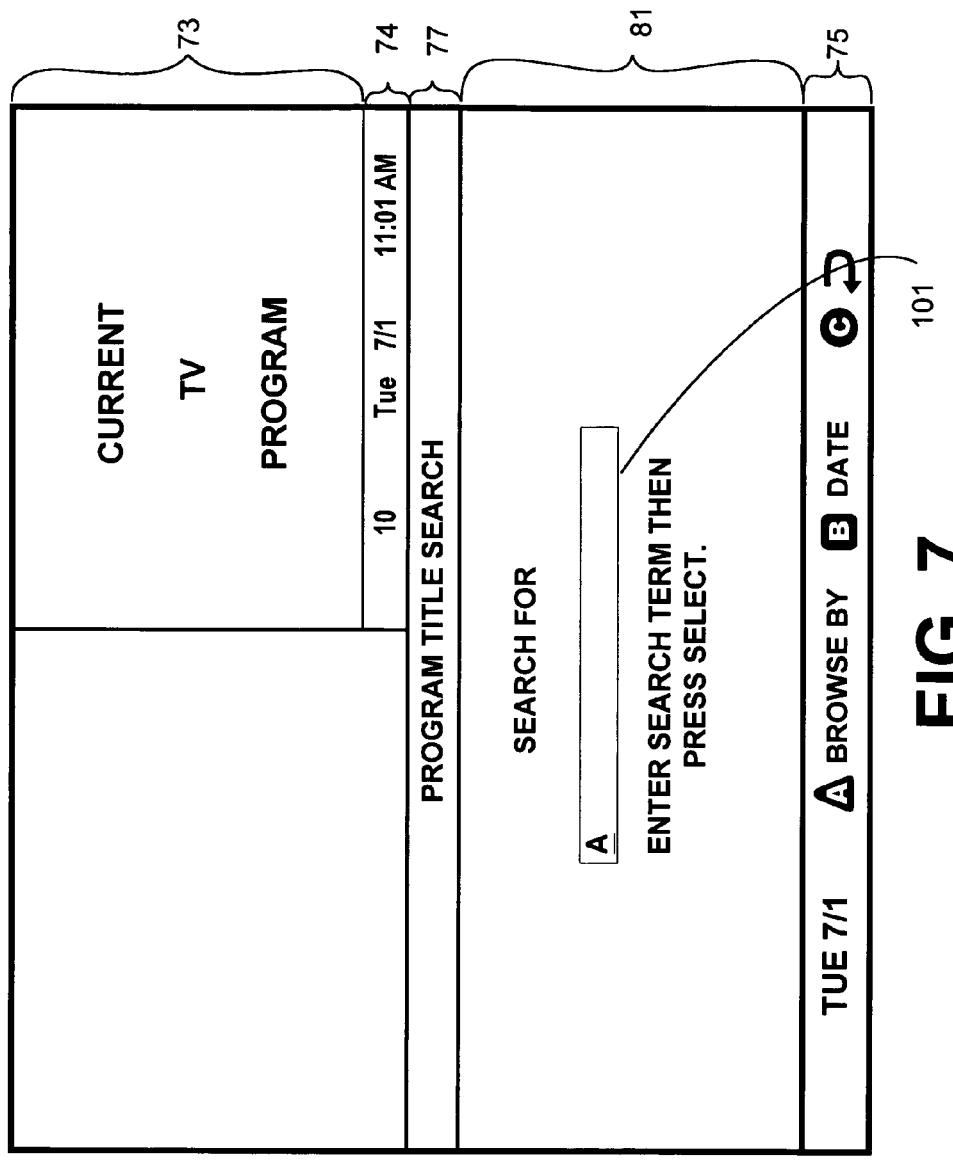
FIG. 7 is an example screen diagram that illustrates a guide arrangement used for displaying a search term that is received by the DHCT as depicted in FIG. 2.

FIG. 7 is an example screen of an IPG display 100 that illustrates a guide arrangement in a search format that the IPG 38 as depicted in FIG. 2 presents to a subscriber. In the non-limiting example in FIG. 7, the subscriber is presented with an input field 101 in the input portion 81 of the IPG 100. The subscriber may use a remote 27 (FIG. 2) to scroll through and select characters in order to construct a search term that the DHCT 16 will incorporate into the input field 101. UP/DOWN 20 keys on a remote 27 would cause a cursor in the input field 101 to scroll through all available search characters (A-Z, 0-9), and LEFT/RIGHT keys would enable the user to proceed to the next or previous character in a desired search string. In other embodiments, the screen would also include characters above and below the input field 101 showing one or more preceding and succeeding characters in a wrapping arrangement. Available characters include any alpha-numeric character used in the data to be searched. In addition, the subscriber may utilize a keyboard for specifying the search term. In a preferred embodiment, the subscriber would use a keyboard that communicates with the DHCT 16 through infrared signals. A similar result can also be achieved using a keyboard that is electronically coupled to the DHCT 16.

Figure 8:
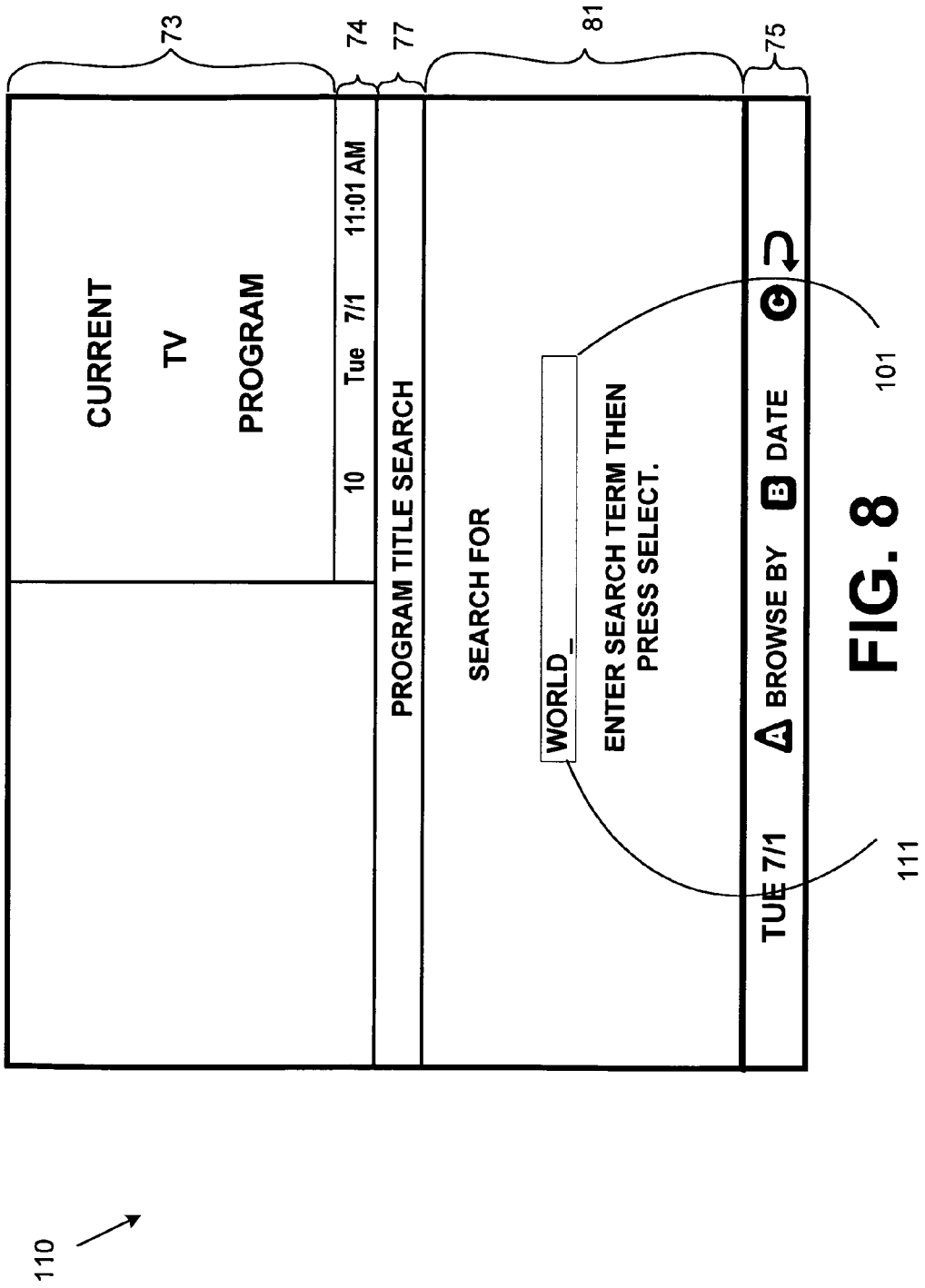
FIG. 8 is an example screen diagram of to the guide arrangement in FIG. 7 after a search term is received by the DHCT as depicted in FIG. 2.

FIG. 8 is an example screen of an IPG display 110 that illustrates a guide arrangement in a search format that displays a search term 111 as received according to user input while the IPG display 100 is being presented by the DHCT 16 (FIG. 2). It should be noted that the search term 111 is just an example and that, in general, search terms may include one or more words or characters. After the DHCT 16 receives input signaling that the entire search term 111 has been specified, i.e., the "SELECT" button is pressed on the remote 27 (FIG. 2), a text search of program titles in the IPG database 40 (FIG. 2) is performed by the IPG 38 (FIG. 2) and the IPG display 120 (FIG. 9) is presented to the subscriber. In other embodiments, various types of program data, including program titles, program descriptions, etc., are searched. Such embodiments may also include additional user interface mechanisms to enable a user to select which types of program data to search.

Figure 9:
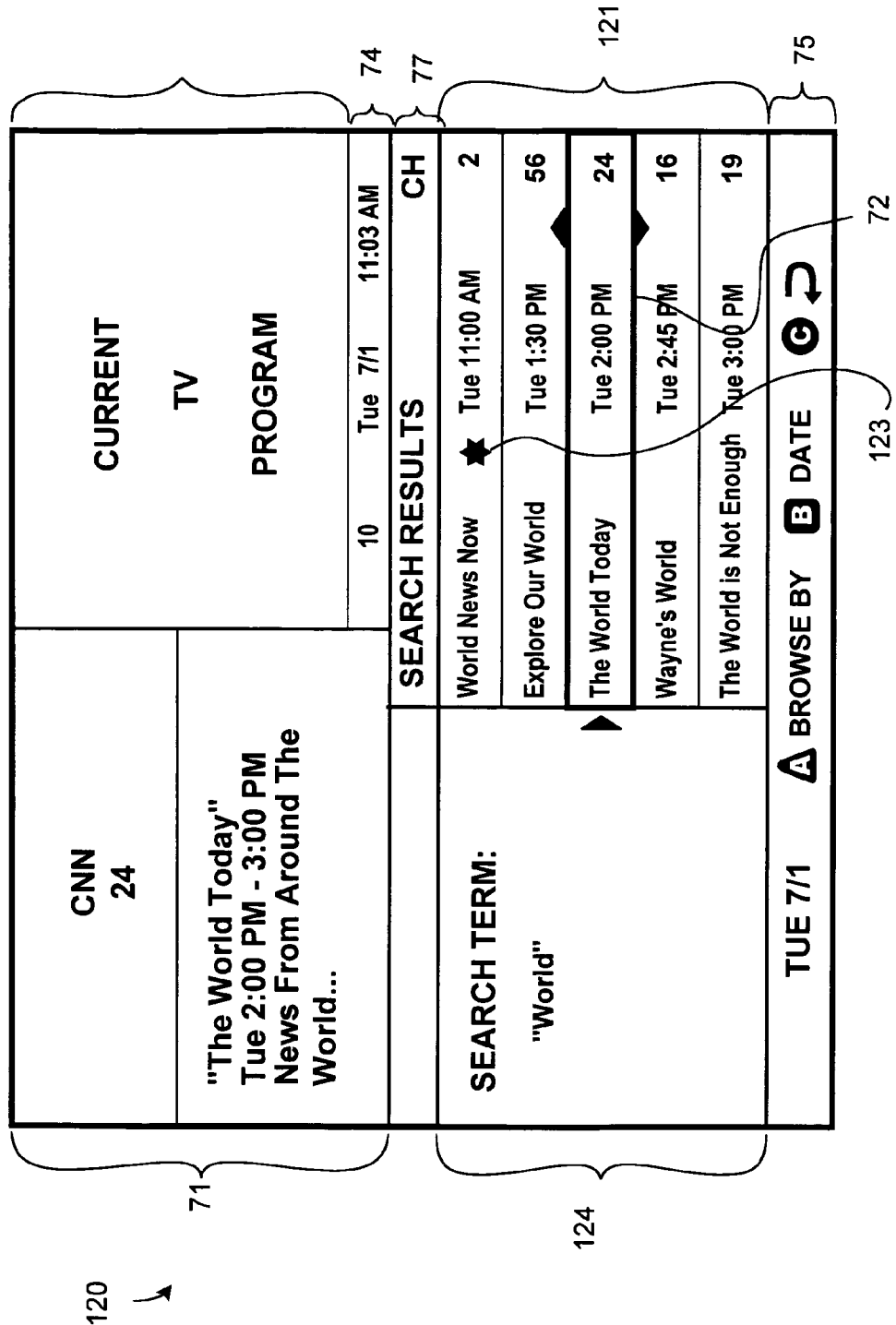
FIG. 9 is an example screen diagram that illustrates a guide arrangement showing search results that the DHCT as depicted in FIG. 2 presents the subscriber.

FIG. 9 is an example screen of an IPG display 120 that illustrates a guide arrangement in a search results view. The television program information in the search results portion 121 includes television program titles, days, starting times, and channel numbers corresponding to television programs with titles that contain part of or all of the search term 111 (FIG. 8) and which are available for viewing during the time period specified in the input portion 89 of the IPG display 80 illustrated in FIG. 5. The television program information is ordered according to the starting times of the television programs to which they respectively correspond with the earliest starting program being listed first. A star 123 is included in the search results portion 121 to denote a program currently showing on one of the channels available to the subscriber. The highlighted program area 72 is centered in the search results portion 121 enabling the subscriber to scroll up and down to the various programs listed in the search results portion 121. Detailed program information is displayed for the program that is highlighted by the highlighted program area 72 in the detailed focus area 71 of the IPG display 120. The search parameter portion 124 displays the search term.

FIG. 10 is an example screen diagram of an IPG display 130 that, in accordance with another embodiment of the present invention, illustrates a combination guide arrangement with a browse-by menu 94 and a selectable time periods area 96. Such a screen essentially combines the functionality provided by the "A" and "B" keys displayed in FIG. 4, thus allowing a separate function to be assigned to one of those keys, i.e., there would be no need for a separate "Date" option in FIG. 4. Upon selecting the search view and a date, the search view of IPG display 100 of FIG. 7 would be displayed for the entry of a search term, as discussed above.

It should be emphasized that the above-described embodiments of the present invention, particularly, any "preferred embodiments" are merely possible examples of the implementations, merely setting forth for a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

We claim:

1. A programmable television services client device for enabling a user to search for television program information, said client device comprising:
   memory comprising:
      program information corresponding to a plurality of television programs;
      an initial interactive program guide (IPG) arrangement; and
      a user interface (UI) module; and
   a processor configured with the UI module to associate the program information with the initial IPG arrangement, the processor further configured with the UI module to:
      present the initial IPG arrangement on a display device, the initial IPG arrangement including a channel area, a first program display area adjacent the channel area, and a browse-by icon;
      receive a first user input corresponding to selection of the browse-by icon;
      present a first IPG arrangement on the display device responsive to the first user input, the first IPG arrangement comprising a browse-by area that displaces the channel area, the browse-by area having a search option;
      receive a second user input corresponding to selection of the search option;
      present a second IPG arrangement on the display device responsive to the second user input, the second IPG arrangement comprising a user input field that displaces the browse-by area;
      receive a third user input corresponding to a search term, the third user input entered through the user input field;
      search the program information based on the search term; and
      present a third IPG arrangement on the display device responsive to the search, the third IPG arrangement comprising a second program display area that displaces the user input field, the second program display area comprising a search result comprising the program information for a portion of the plurality of television programs where the search term is in a respective television program title.

2. The programmable television services client device of claim 1, wherein the third user input comprises a text string.

3. The programmable television services client device of claim 1, wherein the first program display area is sorted by television program starting time and corresponds to a respective television channel provided in the channel area.

4. The programmable television services client device of claim 1, wherein said processor is further configured with said UI module to, responsive to user selection of the search result, cause a television program identified in the search result to be displayed on said display device.

5. The programmable television services client device of claim 1, wherein said display device comprises a television screen.

6. The programmable television services client device of claim 1, wherein said client device is coupled to a programmable television services server device and said program information is stored in the memory of the client device upon being received from said server device.

7. The programmable television services client device of claim 6, wherein the program information is received from a server via a television network.

8. The programmable television services client device of claim 1, wherein the program information comprises a television program title for each of the plurality of television programs.

9. The programmable television services client device of claim 8, wherein the search is limited to television programs corresponding to a time period selected through user input from a list of two or more time periods.

10. The programmable television services client device of claim 9, wherein a default time period selection consists of the current day and the following day.

11. The programmable television services client device of claim 9, wherein a default time period selection is the current day.

12. The programmable television services client device of claim 9, wherein the time period is specified through user input.

13. The programmable television services client device of claim 9, wherein the portion of the plurality of television programs resulting from the search are scheduled during at least a part of said time period.

14. The programmable television services client device of claim 13, wherein the search result includes a television program title and a television program starting time.

15. The programmable television services client device of claim 1, wherein the search result is selectable by subsequent user input.

16. The programmable television services client device of claim 15, wherein said processor is further configured with said UI module to, responsive to user selection of the search result, cause a television program identified in the search result to be displayed on a viewing device.

17. The programmable television services client device of claim 1, wherein the third user input includes a sequence of sequentially input characters.

18. The programmable television services client device of claim 17, wherein the first, second, and third user inputs are received via a television remote control device.

19. The programmable television services client device of claim 17, wherein the first, second, and third user inputs are received via a remote keyboard.

20. The programmable television services client device of claim 17, wherein the first, second, and third user inputs are received via a keyboard coupled to the programmable television services client device.

21. The programmable television services client device of claim 17, wherein the search result is related to a television program title that contains the sequence of characters entered via the third user input.

22. The programmable television services client device of claim 21, wherein the search result includes a television program title.

23. The programmable television services client device of claim 22, wherein the search result includes a television program starting time.

24. The programmable television services client device of claim 23, wherein the search result identifies a television channel.

25. The programmable television services client device of claim 17, wherein the search result is related to a television program description that contains at least a portion of the sequence of characters.

26. The programmable television services client device of claim 25, wherein the search result includes a television program title.

27. The programmable television services client device of claim 26, wherein the search result includes a television program starting time.

28. The programmable television services client device of claim 27, wherein the search result identifies a television channel.

29. The programmable television services client device of claim 17, wherein the search result is selectable by subsequent user input.

30. The programmable television services client device of claim 29, wherein said processor is further configured with said UI module to, responsive to user selection of the search result, cause a television program identified in the search result to be displayed on said display device.

31. The programmable television services client device of claim 1, wherein the program information contains program data files of current and future television programs.

32. A method for implementing a programmable television services client device to enable a user to search for television program information, said method for implementing a programmable television services client device comprising the steps of:
    presenting an initial IPG arrangement on a display device, the initial IPG arrangement including a channel area, a first program display area adjacent the channel area, and a browse-by icon;
    receiving a first user input corresponding to selection of the browse-by icon;
    presenting a first IPG arrangement on the display device responsive to the first user input, the first IPG arrangement comprising a browse-by area that displaces the channel area, the browse-by area having a search option;
    receiving a second user input corresponding to selection of the search option;
    presenting a second IPG arrangement on the display device responsive to the second user input, the second IPG arrangement comprising a user input field that displaces the browse-by area;
    receiving a third user input corresponding to a search term, the third user input entered through the user input field;
    searching the program information based on the search term; and
    presenting a third IPG arrangement on the display device responsive to the search, the third IPG arrangement comprising a second program display area that displaces the user input field, the second program display area comprising a search result comprising the program information for a portion of the plurality of television programs where the search term is in a respective television program title.

33. The method of claim 32, wherein the search result includes a television program title.

34. The method of claim 33, wherein the search result further includes a television program starting time and a channel number.

35. The method of claim 32, wherein the search result is selectable through user input.

36. The method of claim 35, further comprising a step of causing a television program identified in the search result to be displayed on said display device.

37. The method of claim 36, wherein said display device comprises a television screen.

38. The method of claim 32, wherein said client device is coupled to a server device via a television network and said program information is received by the client device via a television tuner in said client device.

39. The method of claim 32, further comprising presenting in a fourth IPG arrangement a plurality of user-selected time periods in a displayed list.

40. The method of claim 39, further comprising a step of causing a default time period selection to consist of the current day and the following day.

41. The method of claim 39, further comprising a step of causing a default time period selection to be the current day.

42. The method of claim 32, further comprising a step of causing a user-selected time period to be specified in a fourth IPG arrangement through user input.

43. The method of claim 42, further comprising a step of causing the displayed search result to be related to a television program that is scheduled to be broadcast during at least a part of said time period.

44. The method of claim 43, wherein the search result includes a television program title and a television program starting time.

45. The method of claim 32, further comprising a step of causing the search result to be selectable through subsequent user input.

46. The method of claim 45, further comprising a step of causing a television program identified in the search result to be displayed on the display device.

47. The method of claim 32, wherein the third user input comprises a sequence of characters.

48. The method of claim 47, further comprising a step of causing the first, second, and third user inputs to be received via a television remote control device.

49. The method of claim 47, further comprising a step of causing the first, second, and third user inputs to be received via a remote keyboard.

50. The method of claim 47, further comprising a step of causing the first, second, and third user inputs to be received via a keyboard coupled to the programmable television services client device.

51. The method of claim 47, wherein the search result is related to a television program title that contains at least a portion of the sequence of characters.

52. The method of claim 51, wherein the search result includes a television program title.

53. The method of claim 52, wherein the search result includes a television program starting time.

54. The method of claim 53, wherein the search result includes a television channel.

55. The method of claim 32, wherein the program information contains program data files of current and future television programs.

56. The method of claim 32, wherein the program information is received from a server via a network.

* * * * *